(No Model.)
O. SIMPSON.
TRUCK FOR MOVING HARVESTERS.
No. 283,290. Patented Aug. 14, 1883.
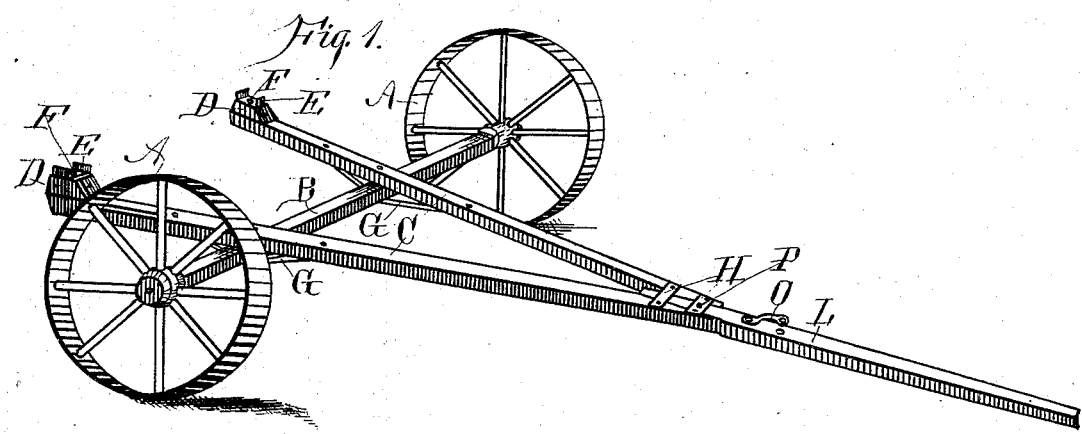
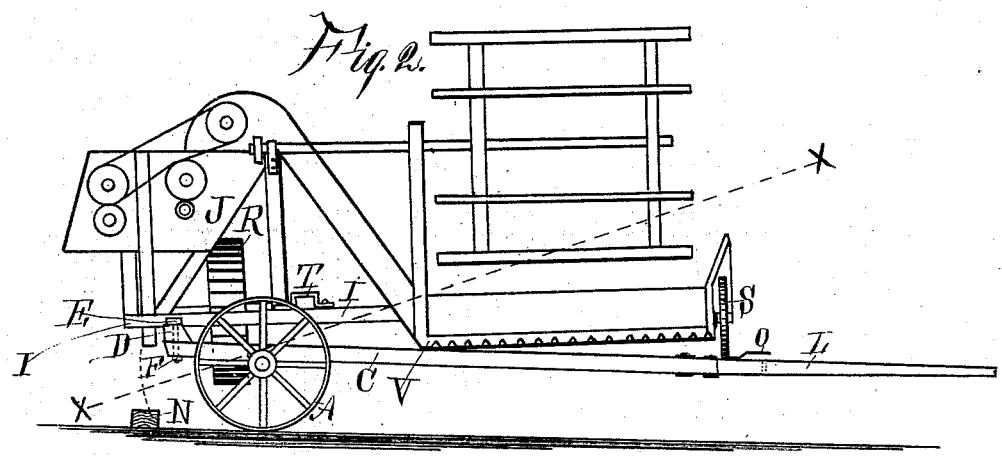
WITNESSES:
A. G. Adamson.
L. A. Adamson.
Orin Simpson
INVENTOR,
C. E. Adamson,
HIS ATTY.

UNITED STATES PATENT OFFICE.

ORIN SIMPSON, OF TAMPICO, INDIANA.

TRUCK FOR MOVING HARVESTERS.

SPECIFICATION forming part of Letters Patent No. 283,290, dated August 14, 1883.

Application filed March 1, 1883. (No model.)

*To all whom it may concern:*

Be it known that I, ORIN SIMPSON, a citizen of the United States, residing at Tampico, in the county of Howard and State of Indiana, have invented a new and useful Improvement in Trucks for Moving Harvesters, of which the following is a specification.

My invention relates to improvements in trucks for moving harvesters; and the objects of my improvements are, first, to construct a cheap, simple, and durable truck for moving harvesters; second, to facilitate the loading and unloading of harvesters on a two-wheeled truck. I attain these objects by the mechanism illustrated by the accompanying drawings, in which—

Figure 1 is a perspective view of my truck, and Fig. 2 is a side view of the same with a harvester loaded upon it.

Similar letters refer to similar parts throughout the several views.

My invention consists of the extension-hounds C, being secured to the axle B, having a wheel, A, on each end, the said hounds extending back of the wheels and having blocks D provided with clamps E.

The axle B may be made of wood or metal, and of a length sufficient to cross a common harvester. A wheel, A, is placed on each end of the said axle, and the hounds C are secured to it between the said wheels. The hounds may be secured on top or under the said axle and strengthened by the brace G. The hounds are placed on the axle in a V shape, extending forward several feet from the axle and coming almost together. The plates H hold them firmly at the front end and form a space for inserting the tongue L, which is held by the bolt P. The rear portions of the hounds extend slightly beyond the wheels A, and have blocks D secured on them, as shown. On top of these blocks the metallic clamps E are secured by bolts F, passing through the center of them, so that they may be turned around as desired to clamp on the lower parts of the harvester when loaded upon the truck, as shown in Fig. 2. These clamps are each formed of a piece of flat metal, with each end turned up. (Most clearly shown in Fig. 1.) They prevent the harvester from moving laterally or longitudinally when it is being transported on the truck.

When the harvester is to be loaded upon the truck, the end near the grain-wheel is raised up, so that the under part of the harvester is inclined, as indicated by the dotted line $x$ $x$, causing the lower part of the binder-frame I to rest on the block N or other suitable means. The truck is next run under the harvester until the axle B is near or against the drive-wheel R. The clamps E will then securely fit on the lower part of the frame, as shown in Fig. 2, and the harvester is then let down on the truck, resting on the clamp E, part V, and grain-wheel S, all as shown in Fig. 2. When the harvester is let down on the truck, the binder part I J of the harvester rises, so that the drive-wheel is some distance off of the ground, as shown in Fig. 2. It may be drawn in this way or raised higher by devices common in most of harvesters. The tongue L is then taken out of the fastening T (or stood straight up and an extra one used) and inserted in the opening between the ends of the hounds and plates H, as shown in Fig. 1. A pin, P, is then placed through the said plate and tongue, and the team is attached to the strap $o$ in the usual manner.

As thus described, the harvester is balanced upon the two truck-wheels A A and is drawn lengthwise of itself. Therefore it can be drawn in this way along narrow passages and over uneven ground, where it could not be drawn in the usual way.

Having thus described my invention, I claim the following, and secure the same by Letters Patent:

In a truck for moving harvesters, the combination, with an axle and wheels, of diverging hounds whose forward ends are so connected as to form a bearing for a removable tongue, and whose rear ends are provided with blocks D D and clamps E E, having upturned ends, and secured pivotally by bolts F, to prevent the longitudinal and lateral movement of the harvester upon the truck, substantially as set forth.

ORIN SIMPSON.

Witnesses:
JEHU C. PICKETT,
ANDERSON TIMS.